US011274782B2

(12) United States Patent
Petrou et al.

(10) Patent No.: US 11,274,782 B2
(45) Date of Patent: Mar. 15, 2022

(54) MULTIPLE PASSAGE ROTARY UNION

(71) Applicant: Deublin Company, Waukegan, IL (US)

(72) Inventors: Anton A. Petrou, Hawthorn Woods, IL (US); Lisa Freed, Cary, IL (US)

(73) Assignee: Deublin Company, LLC, Waukegan, IL (US)

( * ) Notice: Subject to any disclaimer, the term of this patent is extended or adjusted under 35 U.S.C. 154(b) by 409 days.

(21) Appl. No.: 16/152,749

(22) Filed: Oct. 5, 2018

(65) Prior Publication Data

US 2019/0107236 A1    Apr. 11, 2019

Related U.S. Application Data

(60) Provisional application No. 62/569,913, filed on Oct. 9, 2017.

(51) Int. Cl.
*F16L 39/04* (2006.01)
*F16L 39/06* (2006.01)

(52) U.S. Cl.
CPC .............. *F16L 39/04* (2013.01); *F16L 39/06* (2013.01)

(58) Field of Classification Search
CPC ......... F16L 39/04; F16L 39/06; F16L 27/087; F16L 27/0828
USPC ............................................. 285/95, 98, 272
See application file for complete search history.

(56) References Cited

U.S. PATENT DOCUMENTS

| 2,343,491 A | 3/1944 | Bard et al. |
| 2,458,343 A | 1/1949 | Carleton |
| 2,557,498 A | 6/1951 | Collender |
| 2,768,843 A | 10/1956 | Zeilman |
| 4,294,454 A * | 10/1981 | Cannings ............. F16J 15/3484 277/366 |
| 7,815,194 B2 * | 10/2010 | Suzuki .................... F16L 39/04 277/372 |
| 2008/0302994 A1 | 12/2008 | Syzkulski |
| 2016/0258564 A1 | 9/2016 | Fukumoto et al. |
| 2017/0074445 A1 | 3/2017 | Kikuyama et al. |

(Continued)

FOREIGN PATENT DOCUMENTS

| CN | 1688836 A | 10/2005 | |
| CN | 101351667 A | 1/2009 | |
| DE | 4133262 A1 * | 4/1993 | ............. F16L 39/06 |

(Continued)

OTHER PUBLICATIONS

International Patent Application No. PCT/US2018/054538, Search Report (dated Dec. 7, 2018).

(Continued)

*Primary Examiner* — Matthew Troutman
*Assistant Examiner* — Fannie C Kee
(74) *Attorney, Agent, or Firm* — Leydig, Voit & Mayer, Ltd.

(57) ABSTRACT

A rotary union includes a housing having a shaft rotatably mounted in a bore. A plurality of annular plates is mounted on the shaft in spaced relation, and a plurality of spools is disposed in alternating fashion between the plurality of annular plates on the shaft. Each spool includes two seal rings creating mechanical face seals with adjacent annular plates. The shaft, the plurality of annular plates and the plurality of spools are arranged to assemble in a stacked arrangement, which is insertable as a whole into the cylindrical bore of the housing.

17 Claims, 5 Drawing Sheets

(56) References Cited

U.S. PATENT DOCUMENTS

2017/0219144 A1    8/2017  Petrou et al.

FOREIGN PATENT DOCUMENTS

| EP | 0014568 A1 | * | 8/1980 | ............. F16L 39/04 |
| GB | 2041467 A | * | 9/1980 | ............ F16L 27/087 |
| JP | 2004019912 A | * | 1/2004 | ............. F16L 39/04 |
| KR | 1020080054893 A | | 6/2008 | |
| WO | WO 2004/090964 A1 | | 10/2004 | |

OTHER PUBLICATIONS

Chinese Patent Application No. 201880065590.2, Office Action (dated May 31, 2021).
European Patent Application No. 18865799.3 (dated May 21, 2021).

* cited by examiner

MULTIPLE PASSAGE ROTARY UNION

CROSS-REFERENCE TO RELATED APPLICATIONS

The present disclosure claims the benefit of Provisional U.S. patent application Ser. No. 62/569,913, which was filed on Oct. 9, 2017, and which is incorporated herein in its entirety by this reference.

FIELD OF THE DISCLOSURE

The present disclosure relates to rotary unions and, more specifically, to rotary unions having multiple passages.

BACKGROUND OF THE DISCLOSURE

The present disclosure relates to rotary unions and, more specifically, to rotary unions having multiple passages. Rotary unions having multiple passages are known for creating sealed or sealable fluid passages between rotating and non-rotating machine components. Due to their complexity, multiple passage rotary unions are often prone to leakage due to wear or, in some instances, incomplete or incorrect assembly of the device. Moreover, the complex assembly or disassembly process associated with servicing such unions presents a time consuming and costly undertaking.

BRIEF SUMMARY OF THE DISCLOSURE

The present disclosure relates to a rotary union having multiple fluid passages associated therewith. In the multiple-passage rotary union in accordance with the disclosure, a housing forms a generally straight bore that permits the modular assembly of the union, which is an improvement over known rotary union configurations. Additionally, the rotary union in accordance with the disclosure provides improved sealing and interface points over previously proposed designs.

In one aspect, the disclosure describes a rotary union. The rotary union includes a housing having a cylindrical bore extending through a body of the housing, the cylindrical bore being substantially straight. The rotary union further includes a shaft rotatably mounted in the cylindrical bore, the shaft having a longitudinal axis extending along a centerline of the bore. A plurality of annular plates is mounted on the shaft, the plurality of annular plates being spaced apart from one another at regular intervals along the longitudinal axis, each of the plurality of annular plates extending a radial distance from the shaft within the bore and having a radial passage extending therethrough, the plurality of annular plates being rotatably and sealably engaged to rotate with the shaft. A plurality of spools is disposed in alternating fashion between the plurality of annular plates. The plurality of spools sealably engages the cylindrical bore and is axially constrained with the housing so as not to rotate with the shaft. Each of the plurality of spools is disposed between two adjacent annular plates from the plurality of annular plates, and includes a radially extending wall having a fluid passage extending radially therethrough. Two seal rings are slidably disposed along the longitudinal axis and biased in opposite directions so that the two seal rings slide against side faces of the two adjacent annular plates when the shaft is rotating. The shaft, the plurality of annular plates and the plurality of spools are arranged to assemble in a stacked arrangement, which is insertable as a whole into the cylindrical bore of the housing.

In another aspect, the disclosure describes a multiple passage rotary union. The multiple passage rotary union includes a housing including a unitary body having a bore extending therethrough between two bore openings. The housing includes a plurality of fluid outlet openings disposed at different axial locations along a centerline of the bore and extending from the bore through the housing, and a bearing disposed in each of the two bore openings. A shaft extends through the bore and is rotatably mounted in the bore via the bearings. The shaft forms a plurality of fluid passages therethrough, each of the plurality of fluid passages extending from an axial opening on an end face of the bore to a radial opening disposed at an axial distance along a longitudinal axis of the shaft. The axial opening and the radial opening of each of the plurality of passages is fluidly connected via a media channel extending within the shaft and parallel to the longitudinal axis at an offset radial distance relative to a centerline of the shaft, which coincides with the centerline of the bore when the shaft is disposed in the bore. The plurality of fluid passages includes at least: a first passage having a first axial opening connected to a first radial opening by a first media channel; a second passage having a second axial opening connected to a second radial opening by a second media channel; and a third passage having a third axial opening connected to a third radial opening by a third media channel, wherein the third radial opening is disposed between the first and second radial openings relative to an axial location along the centerline of the shaft.

In one embodiment, a first annular plate is sealably engaged around an axial location of the shaft that includes the first radial opening. The first annular plate has a radial passage extending therethrough that is axially aligned and fluidly communicates with the first radial opening of the shaft and a corresponding first fluid outlet opening of the housing. A second annular plate is sealably engaged around an axial location of the shaft that includes the second radial opening. The second annular plate has a radial passage extending therethrough that is axially aligned and fluidly communicates with the second radial opening of the shaft and a corresponding second fluid outlet opening of the housing. A spool is sealably engaged around an axial location of the shaft that is between the first and second annular plates. The spool includes a radial passage extending therethrough that is axially aligned and fluidly communicates with the third radial opening of the shaft and a corresponding third fluid outlet opening of the housing. The spool further includes a first seal ring slidably and sealably disposed in an axial direction on the spool. The first seal ring sealably engages an annular face of the first annular plate to form a sliding, mechanical face seal. The spool further includes a second seal ring slidably and sealably disposed in the axial direction on the spool. The second seal ring sealably engages an annular face of the second annular plate to also form a sliding, mechanical face seal.

In yet another aspect, the disclosure describes a method for assembling a multiple-passage rotary union. The method includes providing a shaft having a free end and a flanged end, a plurality of annular plates, and a plurality of spools. One of the plurality of annular plates and one of the plurality of spools are inserted onto the shaft from the free end in alternating fashion to create a stack. The stack is secured onto the shaft with a fastener, and is inserted into a bore of a housing.

BRIEF DESCRIPTION OF THE SEVERAL VIEWS OF THE DRAWINGS

Each of FIGS. 4 and 5 are enlarged details of the cross section of FIG. 3.

DETAILED DESCRIPTION OF THE DRAWINGS

Figure 1:
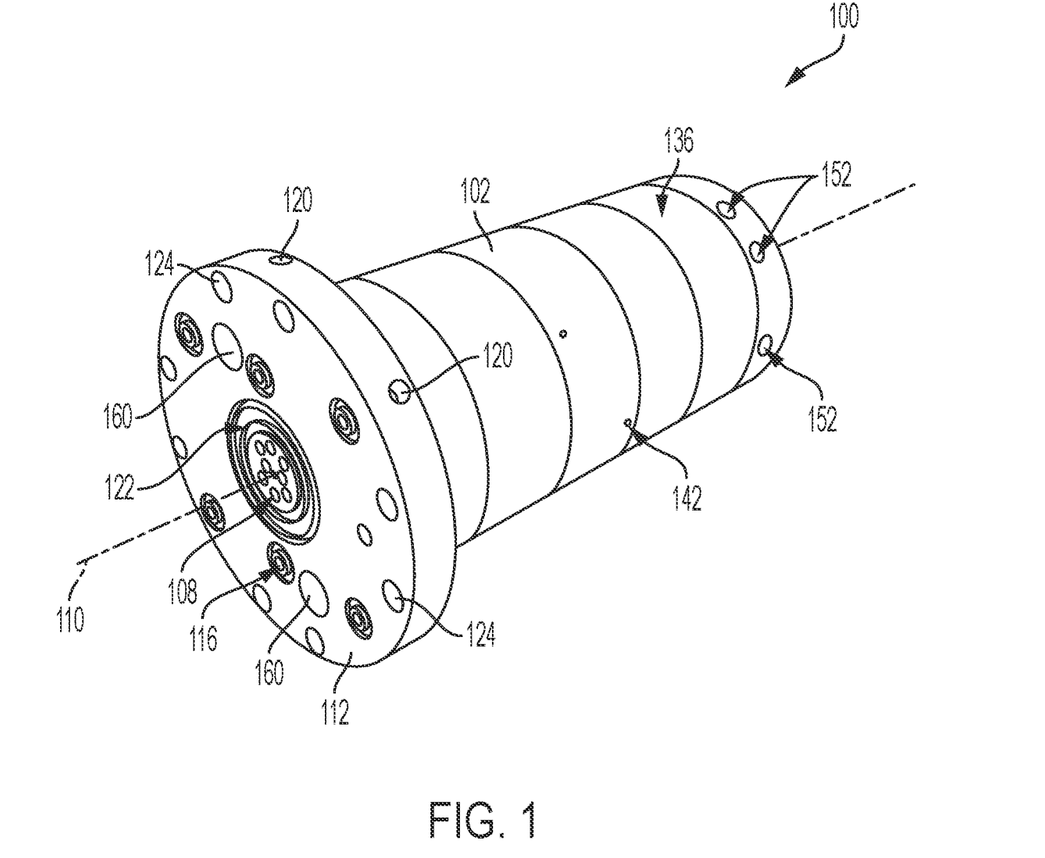
FIG. 1 is an outline view from a front perspective of a multiple-passage rotary union in accordance with the disclosure.
Figure 2:
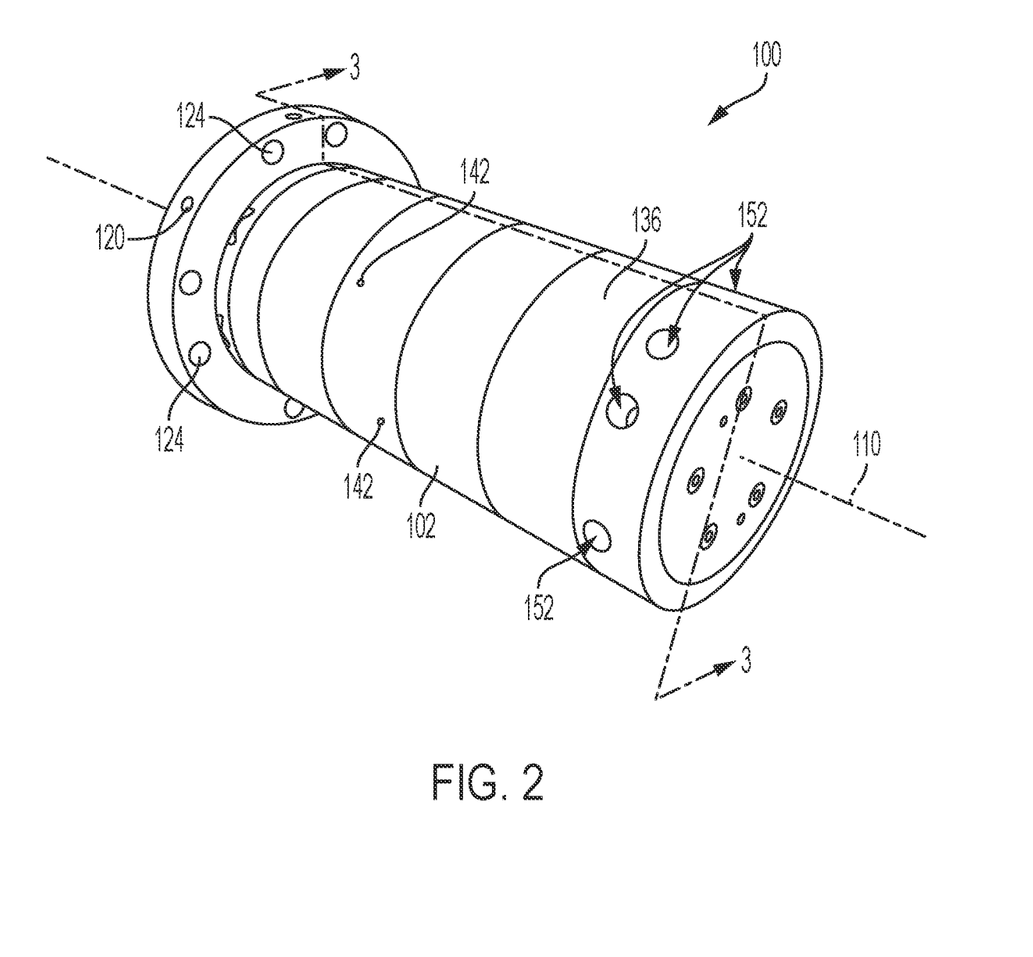
FIG. 2 is an outline view from a rear perspective of a multiple-passage rotary union in accordance with the disclosure.

Outline views from the front and rear perspectives of a rotary union 100 are shown in FIGS. 1 and 2, respectively. The rotary union 100 in the illustrated embodiment includes eight fluid passages, but it should be appreciated that its modular construction is suited for rotary unions having fewer or more than eight passages. As shown, the rotary union 100 includes a housing 102 that surrounds a rotor shaft 104, which can be seen in the cross section of FIG. 3. The rotor shaft 104 is connected to a flange 106 that provides fluid interfaces for the various fluid passages extending through the rotary union 100. These fluid passages, as will be described hereinafter in additional detail, extend through the union and are fluidly isolated from one another, and from the environment, by use of sliding, mechanical face seals formed along sliding interfaces of components attached between the rotatable rotor shaft 104 and the housing 102.

Figure 3:
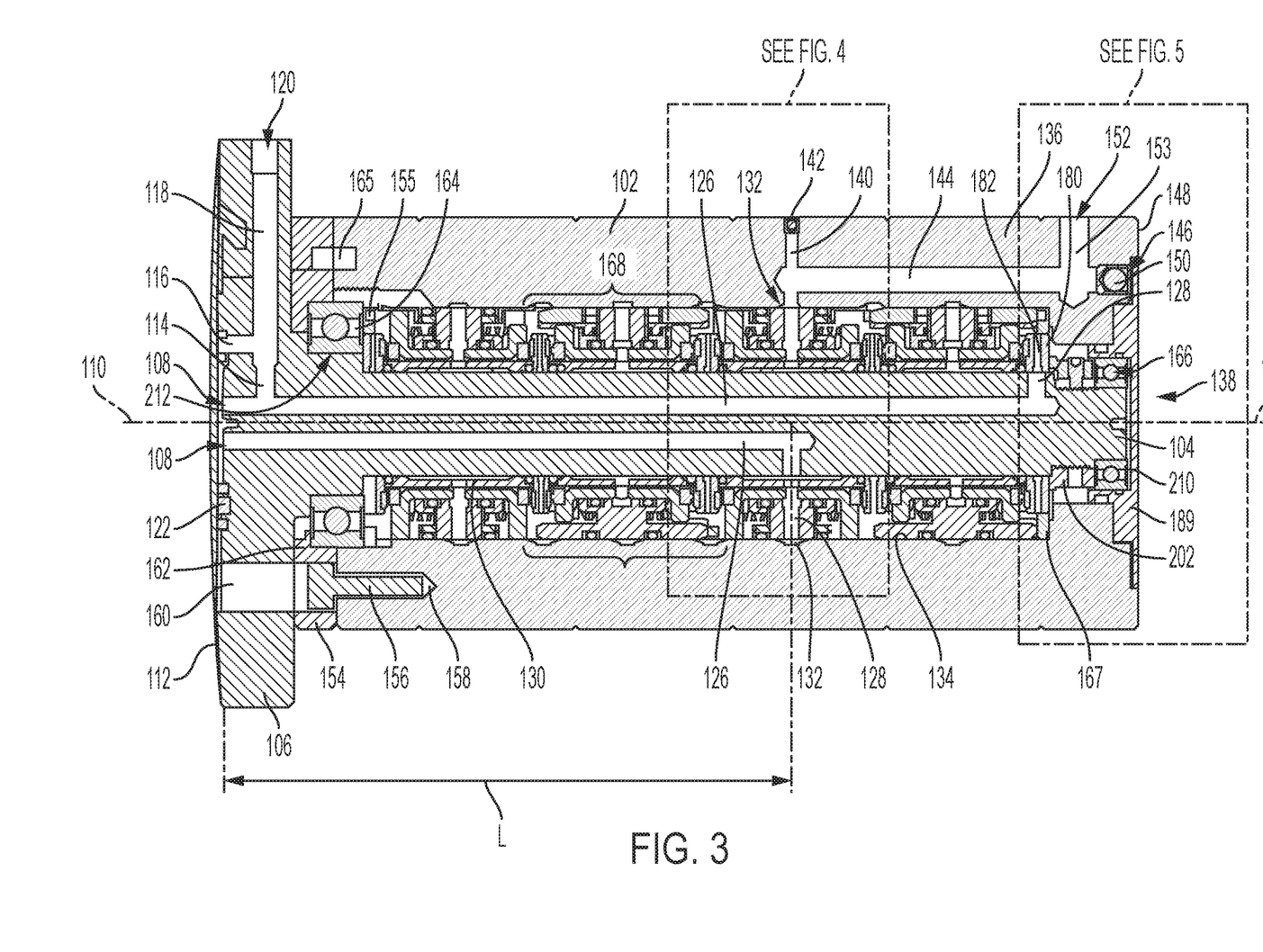
FIG. 3 is a cross section of the multiple-passage rotary union shown in FIGS. 1 and 2.

In the embodiment shown, the flange 106 includes one or more rotating fluid ports 108 (eight shown) that are arranged around a rotation axis 110 on a rear face 112 of the flange 106. The arrangement can be symmetrical or asymmetrical. The shape of the flange 106 is shown as a flat plate having a circular shape that is configured for connection to a rotating machine component (not shown). The flange 106 provides the flexibility or opportunity to include various other passages and fluid ports disposed at locations that facilitate the connection of the union 100 to a variety of machines. For example, as shown in FIG. 3, each of the rotating fluid ports 108 can also be connected to a radially extending passage 114 and to an additional axially-extending port 116 disposed radially outwardly relative to the rotating fluid ports 108, or to a radially facing fluid port 120 disposed along an outer periphery of the flange 106 via a connecting passage 118, which also extends radially relative to the axis 110. These and other arrangements permit the flexible and convenient connection of fluid passages of the rotating machine component to the union 100. Sealing grooves 122 that accommodate, for example, radial seals (not shown) or any other type of seal or gasket can also be incorporated in the flat surface 112 at the rear of the flange 106, as well as mounting holes 124 for mounting the flange and, thus, the union 100, to the rotating machine component (not shown).

Figure 4:
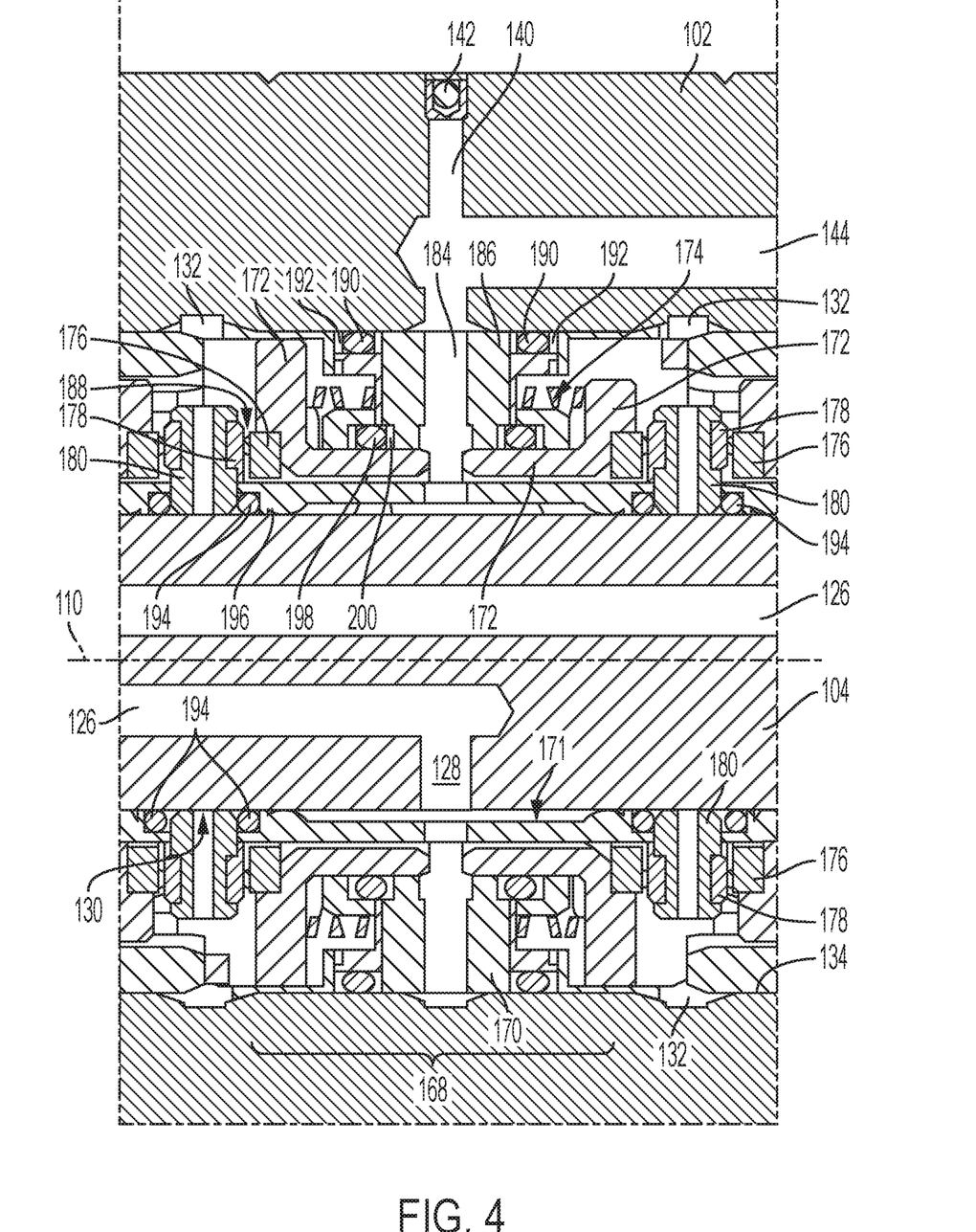
Figure 5:
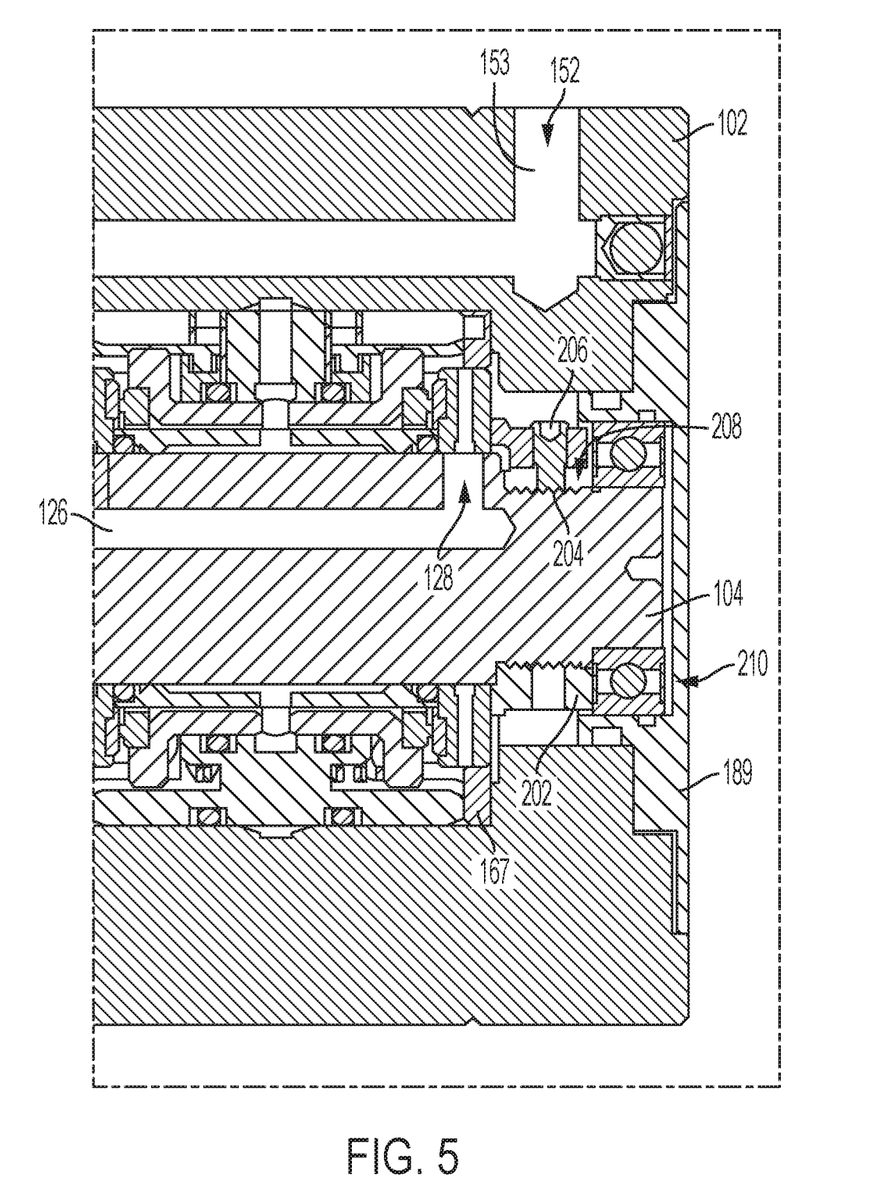

Turning now to the cross section of FIG. 3, and the enlarged details of FIGS. 4 and 5, each rotating fluid port 108 is fluidly connected or open to one of a plurality of media channels 126. The media channels 126 extend internally along a body of the rotor shaft 104. In the illustration of FIG. 3, two media channels 126 are shown, but it should be appreciated that a plurality of media channels 126 extend through the rotor shaft 104, in this case, eight, but only two are visible in the cross section taken at FIG. 3. Each media channel 126 is generally straight and is formed by a gun-drilling operation or other forming operation applied to the rotor shaft 104. Depending on the particular outlet port to which a given media channel 126 is connected, the length of the channel or, stated differently, the depth of the channel into the rotor shaft 104 with respect to the end face 112 of the flange 106, will vary. Moreover, each media channel 126 extends parallel to the axis 110 but at an offset radial distance therefrom such that numerous media channels can be formed around any circular cross section of the rotor shaft 104 and extend parallel to adjacent media channels 126. In one embodiment, the plurality of media channels 126 are arranged around the axis 110.

Each media channel 126 is connected to a cross passage 128 that extends radially outward with respect to the axis 110 and fluidly connects the respective media channel 126 with an outer surface 130 of the rotor shaft 104 at a particular axial location, L, along a length of the rotor shaft 104. The length, L, which will be different for each of the plurality of media channels 126, is arranged to align with a corresponding axial location along the housing 102, in which a corresponding distribution channel 132 is formed. In the illustrated embodiment, there is one distribution channel 132 that corresponds to each media channel 126 and its respective cross passage 128 at the respective length L.

Each distribution channel 132 is formed along an inner bore surface 134 of the housing 102. The housing 102 has a generally cylindrical shape including an outer peripheral surface 136 and a stepped bore 138 extending centrally along the housing 102. Each distribution channel 132 is axially aligned with a corresponding one of the plurality of cross passages 128 and is arranged to receive or provide fluid from/to the respective cross passage 128 regardless of the angular orientation of the rotor shaft 104 relative to the housing 102.

For sake of illustration, with respect to the particular distribution channel 132 that is denoted in FIG. 3, the housing 102 forms a connecting passage 140 that extends radially through the housing 102 between the inner bore surface 134 of a segment of the stepped bore 138 and the outer peripheral surface 136. A plug 142 fluidly closes a radially outer end of the connecting passage 140, and an axial passage 144 formed in the housing 102 and extending parallel to the axis 110 connects each connecting passage 140 with an end port 146 formed in an outer face 148 of the housing 102. As shown, the end port 146 includes a plug 150. A non-rotating fluid port 152 is formed at a free end of a radial passage 153, which is formed in the housing 102, extends radially between the respective axial passage 144 and non-rotating fluid port 152, and fluidly connects the non-rotating fluid port 152 with the corresponding distribution channel 132. In the illustrated embodiment, a set of eight such structures and passages is formed in the housing, each connecting one of eight distribution channels 132 with a corresponding one non-rotating fluid port 152. In this arrangement, the non-rotating fluid connections of the union 100 can all be made at a location around the end of the housing at angularly spaced locations around the periphery of the housing 102.

For attaching the housing 102 and the rotor shaft 104, an adapter ring 154 is connected to an inner end of the housing 102 by fasteners 156 that threadably engage openings 158 formed in the housing 102. The fasteners 156 can be accessed through openings 160 formed in the flange 106. The adapter ring 154 rotationally engages the housing 102 and includes a ledge 162 that abuts a race of a bearing arrangement 164 disposed between the rotor shaft 104 and the housing 102. Alignment pins 165 may also be disposed to rotationally orient and engage the adapter ring 154 with the housing 102 during assembly and operation. At the outer end of the housing 102, a second bearing arrangement 166 rotatably connects the free end of the rotor shaft 104 with the free or outer end of the housing 102.

During operation, fluids such as liquids or gases can be provided in a sealed fashion between each corresponding pair of one rotating fluid port 108 (or one of the rotating ports associated therewith as previously described) and a corresponding one non-rotating fluid port 152, through a fluid passage defined through the union 100. Such fluid passage is fluidly separate from other, similar fluid passages defined through the union 100 and connecting any one of the remaining pairs of rotating and non-rotating fluid ports 108 and 152. Each fluid passage includes fluid conduits formed in the various structures of union 100, and also a sliding, mechanical face seal that isolates the fluid passage from adjacent fluid passages and the environment.

In the illustrated embodiment, a plurality of fluid passages may be defined through the union 100. One of the plurality of such fluid passages can be seen in the cross section of FIG. 3. The fluid passage is defined, in no particular order, to include the rotating fluid port 108, the media channel 126, the cross passage 128, the distribution channel 132, the connecting passage 140, the axial passage 144, the radial passage 153 and the non-rotating fluid port 152. Fluid flow through this fluid passage and also through other, similar fluid passages defined through the union 100, can be in either direction, i.e. from the rotating fluid port 108 towards the non-rotating port 152 or vice versa.

To provide a sliding seal along each passage, the union 100 utilizes sliding ring seals having a balance ratio of between 0 and 1. Balance ratio, as used herein, is the ratio between the net closing to opening hydraulic surface areas of sealing rings used to interface and create a mechanical face seal. As shown in FIG. 3, the union 100 includes four seal ring assemblies 168 that are arranged along the rotor shaft 104. A detailed view of a ring assembly 168 is shown in the enlarged detail view of FIG. 4. In reference to this figure, each ring assembly 168 includes a support spool 170 that mounts and supports two seal ring supports 172, each seal ring support 172 having an "L" cross section, as shown. The seal ring supports 172 are slidably and sealably supported on the support spool 170 in a biased fashion. As shown, a spring 174 is disposed between each seal ring support 172 and the spool 170 and is oriented such that the spring 174 tends to push the seal ring support 172 in an axial direction away from the spool 170. When the two seal ring supports 172 are connected on either axial side of the spool 170, therefore, the two rings are urged apart.

Each seal ring support 172 includes a non-rotating sealing ring 176 mounted thereto. Each non-rotating sealing ring 176 slidably and sealably contacts a rotating sealing ring 178 to form a mechanical face seal therewith along an interface of contact between the two rings. The rotating sealing ring 178 is mounted on an annular plate 180 that is disposed around the rotor shaft 104 and rotatably engaged therewith such that the annular plate 180 and, thus, the rotating sealing rings 178 disposed thereon, rotate together. As can be seen from FIG. 4, and also FIG. 3, for the illustrated embodiment there are five annular plates 180 connected to the rotor shaft 104 at regular intervals that axially coincide with the distribution channels 132 formed along the inner bore surface 134 of the housing 102. Each annular plate 180 except, optionally, the plates disposed at the distal end locations along the rotor shaft, includes two rotating sealing rings 178 disposed on either axial end of the annular plate 180. A radial passage 182, which can be a hole, opening or channel formed in the plate, fluidly connects radially inner and outer portions of the plate and is aligned axially along the rotor shaft 104 with certain cross passages 128, as can be seen on the right side of FIG. 3 for the outermost media channel 126.

Returning now to FIG. 4, it can also be seen that certain cross passages 128 such as the one denoted in the figure are axially aligned along the rotor shaft 104 with a radial passage 184 formed within a radially extending wall 186 of the spool 170. Similar to the annular plates 180, an inner sleeve 171 (FIG. 4) is stacked along the rotor shaft 104 in alternating fashion with the annular plates 180 and includes an opening that is axially aligned with a cross passage 128, the radially extending walls 186 of the corresponding spool 170 and the radial passage 184 formed therein, and with distribution channels 132 formed along the inner bore surface 134 of the housing 102. When viewed together as shown in FIG. 3, it can be seen that the axial locations along the rotor shaft 104 of the annular plates 180 and the radially extending walls 186 of the spools 170 are arranged in alternating fashion for adjacent distribution channels 132 such that, except for the ends of the union 100, each annular plate 180 is disposed between two adjacent radially extending walls 186. Similarly, each radially extending wall 186 is disposed between two adjacent annular plates 180, where each of the alternating annular plates 180 and radially extending walls 186 is aligned with one of a plurality of distribution channels 132.

As described above, each spool 170 includes two seal ring supports 172 disposed on opposite axial ends of the spool 170, which allows each seal ring support 172, and the non-rotating sealing ring 176 carried thereby, to slidably and sealably connect with the rotating sealing rings 178 carried in axially opposed pairs by each annular plate 180. The alternating positioning of the spools 170 and plates 180 creates a pair of sliding mechanical face seals 188 on either axial side of each plate 180 (except for the plates disposed at either axial end of the union) and also on either axial end of each spool 170. In reference to FIG. 3, it can be seen that the union 100 includes four spools 170 arranged in alternating fashion between five annular plates 180. In this arrangement, the union 100 includes eight sliding mechanical face seal interfaces 188 that fluidly separate nine axially extending sealed segments along the rotor shaft 104. Given that the leftmost sealed segment is open to the environment in the orientation of the union 100 shown in FIG. 3, eight sealed segments remain and are arranged to correspond, one each, to each sealed fluid passage extending through the union. It is noted that the distal sealed segment on the right side of FIG. 3 is also sealed by a cap 189 that seals the bore 138 of the housing 102. In the embodiment shown, the leftmost sealed segment is mechanically enclosed to collect any fluids or lubricants that flow therein, and routes any such fluids to a drain (not shown) that extends through the housing 102.

In addition to the mechanical seals 188 formed along the sliding interfaces between the rotating and non-rotating sealing rings 178 and 176, the union 100 further includes static seals that fluidly seal against the inner bore surface 134 of the housing 102 and the outer surface 130 of the rotor shaft 104 to separate the sealed axial chambers defined between the rotor shaft 104 and the bore 138, as described above. In the illustrated embodiment, each of these static seals is formed by a radial seal or O-ring disposed in a channel and having backing rings on either side to prevent rolling or extrusion of the sealing element during operation of the union 100, for example, in the presence of high fluid pressures. These static seals are disposed on either axial side of each distribution channel 132 and sealably engage the inner bore surface 134 on one side, and also sealably engage the outer surface 130 of the rotor shaft 104 on either axial side of each cross passage 128.

The static seals are arranged in channels formed in the inner and outer radial ends of each spool 170 and inner sleeve 171. More particularly, and as shown in FIG. 4, each spool 170 includes two outer channels, each including an outer seal 190 that is surrounded on both axial sides by a backing ring 192. The backing rings 192 have a generally rectangular cross section in the embodiment shown. Each inner sleeve 171 further includes two inner channels, each containing an inner seal 194 that is surrounded by two backing rings 196. The backing rings 196 have a generally triangular cross section that matingly engages triangular features on either side of the respective seal channel and fills the space in the respective channel to avoid extrusion of the inner seals 194 when high fluid pressure is present. It is noted that this seal design is advantageous and avoids leakage between three separately pressurized areas around each inner seal 194. Additionally, each spool 170 includes two intermediate channels, each of which includes a secondary seal 198 that has a backing ring 200 on either axial side. The secondary seals 198 are disposed to sealably and slidably provide a sealing function between the spool 170 and the seal ring supports 172, which are allowed to move during operation.

The union 100 is advantageously suited for modular assembly and construction, which avoids known challenges and issues with previously proposed multiple-passage union designs. For example, assembly of known unions with multiple passageways requires installation of components in an inverted orientation such that sealing rings, springs etc. may be dislocated during insertion in a union. In the union 100, the spools 170 and inner sleeves 171 having all related components already assembled thereon as described above can be inserted into the bore of the housing, or around the rotor shaft, in alternating sequence with the annular plates, to form a stack as a first assembly step. As can be appreciated, the smooth outer surface of the shaft, which does not include ridges, channels or other features except for the radial fluid openings, facilitates the sliding of components along the shaft to form the desired stack. In a second assembly step, the rotor shaft having the stack assembled thereon can be pushed into the bore of the housing to complete the installation. This arrangement also facilitates disassembly of the union for service or parts replacement.

For ensuring proper positioning of the internal components in the assembled union, the spools 170 and inner sleeves 171 are arranged to have an axial length that, when the desired number of spools has been stacked together, results in a desired axial position of all internal components relative to the rotor shaft. To retain the stacked components in place, and to pretension or pre-strain the stacked spool assemblies and the rotor shaft 104, a nut 202 engages threads 204 formed at the free end of the rotor shaft 104, as shown in the enlarged detail of FIG. 5. A predetermined or desired tightening of the nut 202 can seat the various stacked cylindrical assemblies described onto the rotor shaft 104 and also pre-stress or pre-strain the rotor shaft 104 and the inner sleeves 171 by applying an axial force such that the rotor shaft 104 is in tension while the surrounding components connected thereto are in compression, so that dynamic loading onto the rotor shaft resulting from cyclical application of fluid pressure onto the sealing components does not affect component alignment and reduces fatigue on the entire assembly.

The remaining stacked components, including the spools 170 and the components connected thereto, are allowed to "float" so they can settle in their respective positions after assembly of the union 100 is complete. A setscrew 206 is inserted in threaded engagement with the nut 202 and abuts a channel 208 to rotatably secure the nut 202 to the rotor shaft 104 and resist loosening of the stack of spools 170 or inner sleeves 171 during operation. In an alternative embodiment, the setscrew 206 can be replaced by any other appropriate counter-rotation device including a pin, key or the like. When the rotor shaft 104 is inserted into the housing 102, bearings 210 and 212 facilitate rotation of the rotor shaft 104 within the bore 138 of the housing 102. To prevent rotation of the spools 170 relative to the housing 102, spacers 155 and 167 are inserted on either side of the housing 102, in the position shown in FIG. 3 between the outermost spools 170 and the housing 102.

The spacers 155 and 167 can have a keyed arrangement that can matingly engage the housing and the spools 170. As shown, axial loading applied to the spools 170 between the outer race of the bearing 212 and the step at the end of the stepped bore 138, and the friction thus created, prevents rotation of the spools 170 relative to the housing 102 without the need for a keyed arrangement between the spools 170 and the housing. Each of the spools 170 also has a keyed arrangement that matingly engages the spacers 155 and 167, and also adjacent spools such that the entire arrangement of the stacked spools 170 and spacers 155 and 167 is rotatably engaged with the housing 102. It is noted that, in certain applications, the housing 102 and the components rotatably connected therewith can be stationary while the shaft 104 and the components rotatably engaged therewith can be rotating. In certain other applications, for example, an indexing table, or others, the shaft 104 and related components may remain stationary while the housing 102 and related components are rotating or at least pivoting relative to and around the shaft 104, and related components.

When the union 100 has been assembled, it can be appreciated that the location or final installed position of the various internal components including the secondary seals cannot easily be verified visually. In one embodiment, with the housing removed, the internal structures can be sealed externally to perform a quick leakage test that establishes whether the various internal sealing components are present, properly positioned and properly fit. With the union fully assembled, and to confirm the proper positioning and function of the various internal components of the union 100, a pressure test can be carried out that confirms a desired fluid leakage, e.g. of air, between adjacent sealed chambers within the union. Such pressure test can be carried out automatically by applying an air pressure and/or a vacuum and by checking the extent of sealing between rotating and/or non-rotating ports of the union 100.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rotary union, comprising:
   a housing having a cylindrical bore extending through a body of the housing, the cylindrical bore being substantially straight;
   a shaft rotatably mounted in the cylindrical bore, the shaft having a longitudinal axis extending along a centerline of the bore;
   a plurality of annular plates mounted on the shaft, the plurality of annular plates being spaced apart from one another at regular intervals along the longitudinal axis, each of the plurality of annular plates extending a radial distance from the shaft within the bore and having a radial fluid passage extending therethrough, the plurality of annular plates being rotatably and sealably engaged to rotate with the shaft;
   a plurality of spools disposed in alternating fashion between the plurality of annular plates, the plurality of spools sealably engaging the cylindrical bore and being rotatably engaged with the housing so as not to rotate with the shaft, each of the plurality of spools being axially disposed between two adjacent annular plates from the plurality of annular plates, each of the plurality of spools comprising:
      a radially extending wall having a fluid passage extending radially therethrough; and
      two non-rotating seal rings slidably disposed along the longitudinal axis and biased in opposite directions so that the two seal rings slide against side faces of the two adjacent annular plates when the shaft is rotating;
   wherein the shaft, the plurality of annular plates and the plurality of spools are arranged to assemble in a stacked arrangement, the stacked arrangement being insertable as a whole into the cylindrical bore of the housing.

2. The rotary union of claim 1, wherein a first fluid passage extends from a first opening on an axial end-face of the shaft, through a first media channel extending parallel to the longitudinal axis through at least a portion of the shaft, through a first radial passage formed in one of the plurality of annular plates, and through a first outlet passage formed in the housing.

3. The rotary union of claim 2, wherein a second fluid passage extends from a second opening on the axial end-face of the shaft, through a second media channel extending parallel to the longitudinal axis, the second media channel being fluidly isolated from the first media channel, through a second radial passage formed in one of the plurality of spools, and through a second outlet passage formed in the housing.

4. The rotary union of claim 3, wherein the plurality of annular plates consists of five annular plates.

5. The rotary union of claim 4, wherein the plurality of spools consists of four spools dispersed in alternating fashion between the five annular plates such that each of the four spools is placed between two adjacent annular plates.

6. The rotary union of claim 1, further comprising a nut threadably engaged on a free end of the shaft, the nut applying an axial force on the stacked arrangement.

7. The rotary union of claim 1, wherein each of the annular plates has at least one rotating seal ring mounted thereon, and the two non-rotating seal rings slide against the rotating seal rings mounted on the two adjacent annular plates when the shaft is rotating.

8. A multiple passage rotary union, comprising:
   a housing including a unitary body having a bore extending therethrough between two bore openings, the housing including a plurality of fluid outlet openings disposed at different axial locations along a centerline of the bore and extending from the bore through the housing;
   a bearing disposed in each of the two bore openings;
   a shaft extending through the bore, the shaft rotatably mounted in the bore via the bearings, wherein the shaft forms a plurality of fluid passages therethrough, each of the plurality of fluid passages extending from an axial opening on an end face of the bore to a radial opening disposed at an axial distance along a longitudinal axis of the shaft, the axial opening and the radial opening of each of the plurality of passages being fluidly connected via a media channel extending within the shaft and parallel to the longitudinal axis at an offset radial distance relative to a centerline of the shaft, which coincides with the centerline of the bore when the shaft is disposed in the bore;
   wherein the plurality of fluid passages includes at least:
      a first passage having a first axial opening connected to a first radial opening by a first media channel;
      a second passage having a second axial opening connected to a second radial opening by a second media channel; and
      a third passage having a third axial opening connected to a third radial opening by a third media channel, wherein the third radial opening is disposed between the first and second radial openings relative to an axial location along the centerline of the shaft;

a first annular plate sealably engaged around an axial location of the shaft that includes the first radial opening, the first annular plate having a radial passage extending therethrough that is axially aligned and fluidly communicates with the first radial opening of the shaft and a corresponding first fluid outlet opening of the housing;

a second annular plate sealably engaged around an axial location of the shaft that includes the second radial opening, the second annular plate having a radial passage extending therethrough that is axially aligned and fluidly communicates with the second radial opening of the shaft and a corresponding second fluid outlet opening of the housing; and a spool sealably engaged around an axial location of the shaft that is between the first and second annular plates, the spool including a radial passage extending therethrough that is axially aligned and fluidly communicates with the third radial opening of the shaft and a corresponding third fluid outlet opening of the housing, the spool further comprising:
  a first seal ring slidably and sealably disposed in an axial direction on the spool, the first seal ring sealably engaging an annular face of the first annular plate to form a sliding, mechanical face seal; and
  a second seal ring slidably and sealably disposed in the axial direction on the spool, the second seal ring sealably engaging an annular face of the second annular plate to form a sliding, mechanical face seal.

9. The multiple passage rotary union of claim 8, wherein the first and second annular plates are rotatably engaged with the shaft, wherein the spool is axially constrained with the housing and wherein, during operation, one of the housing or the shaft is configured to rotate and the other of the housing or the shaft is configured to remain stationary.

10. The multiple passage rotary union of claim 8, further comprising a sleeve sealably disposed around the shaft between the first and second annular plates, the sleeve including a fluid passage that is disposed to fluidly connect the third radial opening of the shaft and the radial passage extending through the spool.

11. The multiple passage rotary union of claim 8, further comprising springs disposed to bias the first and second seal rings against the first and second annular plates, respectively.

12. The multiple passage rotary union of claim 8, further comprising:
  a fourth passage having a fourth axial opening connected to a fourth radial opening by a fourth media channel;
  a fifth passage having a fifth axial opening connected to a fifth radial opening by a fifth media channel, wherein the fifth radial opening is disposed between the second and fourth radial openings relative to an axial location along the centerline of the shaft;
  a third annular plate sealably engaged around an axial location of the shaft that includes the fourth radial opening, the third annular plate having a radial passage extending therethrough that is axially aligned and fluidly communicates with the fourth radial opening of the shaft and a corresponding fourth fluid outlet opening of the housing; and
  a second spool sealably engaged around an axial location of the shaft that is between the second and third annular plates, the second spool including a radial passage extending therethrough that is axially aligned and fluidly communicates with the fifth radial opening of the shaft and a corresponding fifth fluid outlet opening of the housing, the second spool further comprising:
    a third seal ring slidably and sealably disposed in an axial direction on the second spool, the third seal ring sealably engaging an annular face of the second annular plate opposite the annular face of the second annular plate engaged by the second seal ring of the spool, the third seal ring forming a sliding, mechanical face seal; and
    a fourth seal ring slidably and sealably disposed in the axial direction on the second spool, the fourth seal ring sealably engaging an annular face of the third annular plate to form a sliding, mechanical face seal.

13. The multiple passage rotary union of claim 12, further comprising:
  a sixth passage having a sixth axial opening connected to a sixth radial opening by a sixth media channel;
  a seventh passage having a seventh axial opening connected to a seventh radial opening by a seventh media channel, wherein the seventh radial opening is disposed between the fourth and sixth radial openings relative to an axial location along the centerline of the shaft;
  a fourth annular plate sealably engaged around an axial location of the shaft that includes the sixth radial opening, the fourth annular plate having a radial passage extending therethrough that is axially aligned and fluidly communicates with the sixth radial opening of the shaft and a corresponding sixth fluid outlet opening of the housing; and
  a third spool sealably engaged around an axial location of the shaft that is between the third and fourth annular plates, the third spool including a radial passage extending therethrough that is axially aligned and fluidly communicates with the seventh radial opening of the shaft and a corresponding seventh fluid outlet opening of the housing, the third spool further comprising:
    a fifth seal ring slidably and sealably disposed in an axial direction on the third spool, the fifth seal ring sealably engaging an annular face of the third annular plate opposite the annular face of the third annular plate engaged by the fourth seal ring of the second spool, the fifth seal ring forming a sliding, mechanical face seal; and
    a sixth seal ring slidably and sealably disposed in the axial direction on the third spool, the corresponding sixth ring sealably engaging an annular face of the fourth annular plate to form a sliding, mechanical face seal.

14. The multiple passage rotary union of claim 13, further comprising:
  at least an eighth passage having an eighth axial opening connected to an eighth radial opening by an eighth media channel;
  a fifth annular plate sealably engaged around the shaft; and
  a fourth spool sealably engaged around an axial location of the shaft that is between the fourth and fifth annular plates, the fourth spool including a radial passage extending therethrough that is axially aligned and fluidly communicates with the eighth radial opening of the shaft and a corresponding eighth fluid outlet opening of the housing, the fourth spool further comprising:
    a seventh seal ring slidably and sealably disposed in an axial direction on the fourth spool, the seventh seal ring sealably engaging an annular face of the fourth annular plate opposite the annular face of the fourth annular plate engaged by the sixth seal ring of the third spool, the seventh seal ring forming a sliding, mechanical face seal; and an eighth seal ring slidably and sealably disposed in the axial direction on the fourth spool, the eighth seal ring sealably engaging an annular face of the fifth annular plate to form a sliding, mechanical face seal.

15. The multiple passage rotary union of claim 8, further comprising a nut threadably engaged on a free end of the shaft opposite the first, second and third axial openings of the shaft, the nut applying an axial force to urge the first annular plate, the spool, and the second annular plate together along the centerline.

16. The multiple passage rotary union of claim 8, wherein the housing has a cylindrical shape, wherein the bore extends concentrically relative to the housing, and wherein the shaft has a smooth outer surface at a uniform outer diameter.

17. The multiple passage rotary union of claim 8, wherein the plurality of fluid outlet openings of the housing extend in a radial or axial direction relative to the bore.

\* \* \* \* \*